United States Patent
Grieff et al.

(10) Patent No.: US 6,961,813 B2
(45) Date of Patent: *Nov. 1, 2005

(54) SYSTEM AND METHOD FOR PROVIDING MULTI-INITIATOR CAPABILITY TO AN ATA DRIVE

(75) Inventors: Thomas Grieff, Cypress, TX (US); James R. Reif, Houston, TX (US); Albert Chang, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 105 days.

This patent is subject to a terminal disclaimer.

(21) Appl. No.: 10/373,969

(22) Filed: Feb. 25, 2003

(65) Prior Publication Data

US 2003/0236953 A1 Dec. 25, 2003

Related U.S. Application Data

(63) Continuation-in-part of application No. 10/177,274, filed on Jun. 21, 2002.

(51) Int. Cl.[7] .......................... G06F 11/00; G06F 12/00
(52) U.S. Cl. ....................... 711/112; 711/151; 711/158; 710/40; 710/244
(58) Field of Search ............................... 711/112, 114, 711/151, 158; 710/40, 72, 74, 240, 244, 316

(56) References Cited

U.S. PATENT DOCUMENTS

| | | | |
|---|---|---|---|
| 5,003,591 A | | 3/1991 | Kauffman et al. |
| 5,408,627 A | * | 4/1995 | Stirk et al. .................. 711/151 |
| 5,802,365 A | | 9/1998 | Kathall et al. |
| 6,021,429 A | | 2/2000 | Danknick |
| 6,098,114 A | * | 8/2000 | McDonald et al. ............. 710/5 |
| 6,105,066 A | | 8/2000 | Hayes, Jr. |
| 6,134,630 A | * | 10/2000 | McDonald et al. ......... 711/114 |
| 6,138,176 A | * | 10/2000 | McDonald et al. ............. 710/6 |
| 6,167,522 A | | 12/2000 | Lee et al. |
| 6,199,194 B1 | | 3/2001 | Wang et al. |
| 6,266,809 B1 | | 7/2001 | Craig et al. |
| 6,301,625 B1 | * | 10/2001 | McDonald et al. ............. 710/5 |
| 6,353,848 B1 | | 3/2002 | Morris |
| 6,356,979 B1 | | 3/2002 | Sicola et al. |
| 6,360,362 B1 | | 3/2002 | Fichtner et al. |

(Continued)

FOREIGN PATENT DOCUMENTS

WO   WO 3063000 A1 * 7/2003 ........... G06F/13/00

OTHER PUBLICATIONS

Enabling the future, Serial ATA Working Group, http://www.serialata.org/faqs.html, Nov. 9, 2001, pp. 1–2.

(Continued)

*Primary Examiner*—Kevin Verbrugge

(57) ABSTRACT

A multi-port adapter and method of operation suitable for use with serial ATA devices is disclosed. An adapter includes a switch that receives input from multiple host devices and an arbiter module for assigning a priority scheme to received commands. An outstanding request table is implemented as a memory module for storing identifying information associated with commands received from multiple host devices, and a free pointers queue is maintained to track slots available in the outstanding request table. A command tracker state machine decodes incoming requests from hosts, monitors the execution by these commands by the ATA device, and updates the memory module to reflect completion of commands. Also disclosed is a storage system including an adapter of the present invention and ATA storage devices.

39 Claims, 11 Drawing Sheets

U.S. PATENT DOCUMENTS

| | | | |
|---|---|---|---|
| 6,377,994 B1 | | 4/2002 | Ault et al. |
| 6,418,469 B1 | | 7/2002 | Justice et al. |
| 6,421,760 B1 | * | 7/2002 | McDonald et al. ......... 711/114 |
| 6,438,643 B1 | | 8/2002 | Ohara et al. |
| 6,466,973 B2 | | 10/2002 | Jaffe |
| 6,496,900 B1 | * | 12/2002 | McDonald et al. ......... 711/112 |
| 6,549,981 B2 | * | 4/2003 | McDonald et al. ......... 711/114 |
| 6,763,402 B2 | * | 7/2004 | Talati ........................ 710/36 |
| 6,792,486 B1 | * | 9/2004 | Hanan et al. ................ 710/74 |
| 6,859,896 B2 | * | 2/2005 | Apperley et al. ............ 714/48 |
| 2002/0002606 A1 | | 1/2002 | Jaffe |
| 2002/0046268 A1 | | 4/2002 | Leong et al. |
| 2002/0059487 A1 | * | 5/2002 | Talati ........................ 710/36 |
| 2002/0087898 A1 | * | 7/2002 | Bormann et al. ........... 713/300 |
| 2002/0159311 A1 | * | 10/2002 | Coffey et al. ............... 365/200 |
| 2002/0174297 A1 | * | 11/2002 | McDonald et al. ......... 711/114 |
| 2003/0120865 A1 | * | 6/2003 | McDonald et al. ......... 711/114 |
| 2003/0135577 A1 | * | 7/2003 | Weber et al. ................ 709/214 |
| 2003/0221061 A1 | * | 11/2003 | El-Batal et al. ............. 711/114 |
| 2003/0224626 A1 | * | 12/2003 | Chang ........................ 439/1 |
| 2004/0078707 A1 | * | 4/2004 | Apperley et al. ............ 714/43 |

OTHER PUBLICATIONS

Enabling the future, Serial ATA Working Group, http://www.serialata.org/index.html, Nov. 9, 2001, p. 1.

Serial ATA: High Speed Serialized AT Attachment, Serial ATA Workgroup, APT Technologies, Inc., Santa Cruz, CA, Aug. 29, 2001, revision 1.0, pp. 1–306.

Alexenko, Michael, ATA for the Enterprise: The Present and Future State of ATA, Maxtor, Feb. 21, 2001, pp. 1–15.

Colson, Bill, Serial ATA: An Evolutionary Transition, Developer UPDATE Magazine, Intel Corporation, Aug. 2000, pp. 1–6.

NASAA Risk Disclosure Guidelines, Sep. 9, 2001, pp. 1–3.

Landis, Hale, ATA–ATAPI.COM, Information, Software and Consulting Services for ATA/ATAPI (IDE/EIDE), SCSI, 1394 and Other Interfaces, http://www.ata–atapi.com, Nov. 9, 2001, pp. 1–4.

Serial ATA: The Next Generation Internal Storage Interconnect, Serial ATA Working Group, www.serialata.org., pp. 1–2.

ATA–ATAPI.COM GOOD and BAD Information Sources, http://www.ata–atapi.com/goodbad.htm, Oct. 4, 1999, pp. 1–2.

How It Works ATA FAQ, http://www.ata–atapi.com/hiw-faq.htm, Apr. 20, 2001, pp. 1–16.

* cited by examiner

Link Layer Primitive Generation
when Pass-Thru mode is disabled.

SYSTEM AND METHOD FOR PROVIDING MULTI-INITIATOR CAPABILITY TO AN ATA DRIVE

RELATED APPLICATION

The present application is a continuation-in-part of U.S. patent application Ser. No. 10/177,274, filed Jun. 21, 2002, entitled "SYSTEM AND METHOD FOR PROVIDING MULTI-INITIATOR CAPABILITY TO AN ATA DRIVE", and assigned to COMPAQ INFORMATION TECHNOLOGIES GROUP, L.P., Houston, Tex., the disclosure of which is herein specifically incorporated by this reference.

BACKGROUND OF THE INVENTION

1. Field of the Invention

The present invention relates to computer-based information storage systems, and more particularly to apparatus and methods for implementing multi-initiator capabilities in AT Attachment (ATA) drives.

2. Background of the Invention

The increased importance of information technology in business processes has fostered increased demands for data storage systems that combine the features of high storage capacity, high reliability, efficient scalabilty, and cost-effectiveness. Early computer systems relied heavily on direct-attached storage (DAS) systems consisting of one or more disk drives coupled to a system bus. DAS systems were not well adapted to satisfy these demands. More recently, storage area network (SAN) technologies have been implemented. SAN architectures permit organizations to uncouple application servers from data servers to provide storage systems with greater capacity, higher reliability, and higher availability.

In operation, users access a storage system through a file system implemented in a storage system computer, typically referred to as a host computer. The term file system refers to the logical structures and software routines, usually closely tied to the operating system software, that are used to control access to storage in the system. A host computer receives requests from external devices for information stored in the storage system, processes the requests, retrieves the desired information from the storage devices, and transmits the information to the external devices. Many SANs implement a high-speed connection, e.g., a Fibre Channel (FC) connection, between the host computer and the storage devices. This connection is enabled by a Host Bus Adapter (HBA), which provides a communication connection between the host bus (typically a PCI bus) and the FC connection.

SAN systems implement redundancy to enhance the reliability of the system. For example, RAID (Redundant Arrays of Inexpensive Disks) techniques are used to enhance data storage reliability. In addition, in many SAN systems data storage devices (e.g., disk drives) are connected to redundant disk controllers by at least one high-speed data communication link, e.g., a Fibre Channel Arbitrated Loop (FCAL), to provide a network of interconnected storage devices. Further, SAN systems may implement redundant components such as power supplies, cooling modules, disk devices, temperature sensors, audible and/or visible alarms, and RAID and other controllers to increase system reliability. If a component fails, then the redundant component assumes the functions of the failed component so the storage system can continue operating while the failed component is repaired or replaced.

Traditionally, enterprise (and other high-reliability) storage systems have used Small Computer Serial Interface (SCSI) drives, rather than ATA drives. SCSI drives are more expensive than ATA drives, but offer certain advantages over ATA drives. Of particular importance, SCSI drives include the hardware and software capability to support multiple initiators (or hosts). This capability is essential in the high-performance data storage market because multi-initiator support is required to implement operations that support high-reliability such as, for example, failover operations.

The Serial ATA Working Group has developed a Serial ATA specification, accessible on the world wide web at http:\\www.serialata.org, to address certain deficiencies in ATA drive operation. Revision 1.0 of the Serial ATA specification is submitted herewith in an information disclosure statement, and its contents are incorporated by reference. This application assumes a degree of familiarity with the operation of ATA devices, and with the Serial ATA specification.

Serial ATA was designed to be a point-to-point protocol, with no support for multi-initiator operation. Due to the single-host nature of both parallel and serial ATA protocol, several limitations must be overcome to enable more than one host to share access to a single drive if ATA command queuing is to be supported.

For example, if an ATA device has queued commands and then receives a non-queued command, the ATA device aborts the non-queued command and discards all the commands that were in its queue. In addition, the Tags sent to an ATA device must be unique. If a queued command is issued with a Tag that is identical to a Tag for a command already in the device's queue, the ATA device will abort all commands in its queue, along with the last command that was issued. Further, when an ATA device is ready to complete a queued command, it gives no indication of which command is ready to be serviced until after the host responds to the Status [SERV] bit being set via the SERVICE command. This is fine for a single-initiator environment, where there is only one possible source of the command that is pending completion. In a multi-initiator environment, however, the command could have been issued by one of several hosts, and the determination of which host sent the command is dependent on the Tag that is returned by the ATA device in response to the SERVICE command. Therefore, there is no way to determine which host to send the Status[SERV] bit to if the device doesn't indicate the source of the command until after it receives a SERVICE command from the source of the command.

Therefore, there is a need in the art for apparatus and methods for enabling multi-initiator support for serial ATA drives. This technology would be tremendously beneficial to the storage industry, and may be beneficial to other computer-based industries.

SUMMARY OF THE INVENTION

This present invention addresses these and other needs by providing apparatus and methods for enabling multiple initiators (or hosts) to access a single serial ATA device, e.g., a disk drive. Such apparatus and methods may track the progress of both queued and non-queued serial ATA commands in a multi-initiator environment to the aforementioned limitations of ATA command queuing. Advantageously, the present invention permits multiple controllers to verify access to an ATA device, e.g., an ATA disk drive, without forcing the main controller to quiet itself and finish pending operations before granting access.

Accordingly, the invention provides an ATA drive with a failover capability that it does not natively possess.

The present invention provides several advantages when implemented in a storage system. By providing a failover capability for ATA drives, it eliminates the necessity for a separate mechanism to determine failure and switch to a backup system. Further it enables cooperating controllers to share device access transparently, and enables non-cooperating controllers to operate simultaneously on non-shared areas of the same device. The controllers can also both be active at the same time allowing performance to scale.

In one aspect, the invention provides an adapter for enabling multiple hosts to share access to a single serial ATA device. The adapter comprises a switch for receiving commands from multiple hosts, a memory module for storing identifying information associated with a received command, an arbitration logic module operatively connected to the switch for assigning a priority scheme to received commands, and a state machine that determines when a received command has been completed by the serial ATA device and updates the memory module to indicate that the command has been completed.

In another aspect, the invention provides a method for enabling multiple hosts to share access to a single serial ATA device. The method comprises the steps of receiving commands from a plurality of hosts; storing identifying information associated with received commands in a memory module; executing an arbitration scheme to assign a priority to received commands; forwarding the received command having the highest priority to the serial ATA device; monitoring execution of the commands by the serial ATA device; and updating the memory module to reflect completion of a command.

In yet another aspect, the invention provides a storage module adaptable for use in a storage area network. The storage module comprises a plurality of host bus adapters that receive communication requests from one or more host computers; plurality of storage devices communicatively connected with the host bus adapters, wherein the plurality of storage devices includes an ATA disk drive; and a dual port adapter connected to at least one ATA disk drive, such that the ATA disk drive can maintain communications with at least two host bus adapters.

DETAILED DESCRIPTION

Overview

Figure 1:
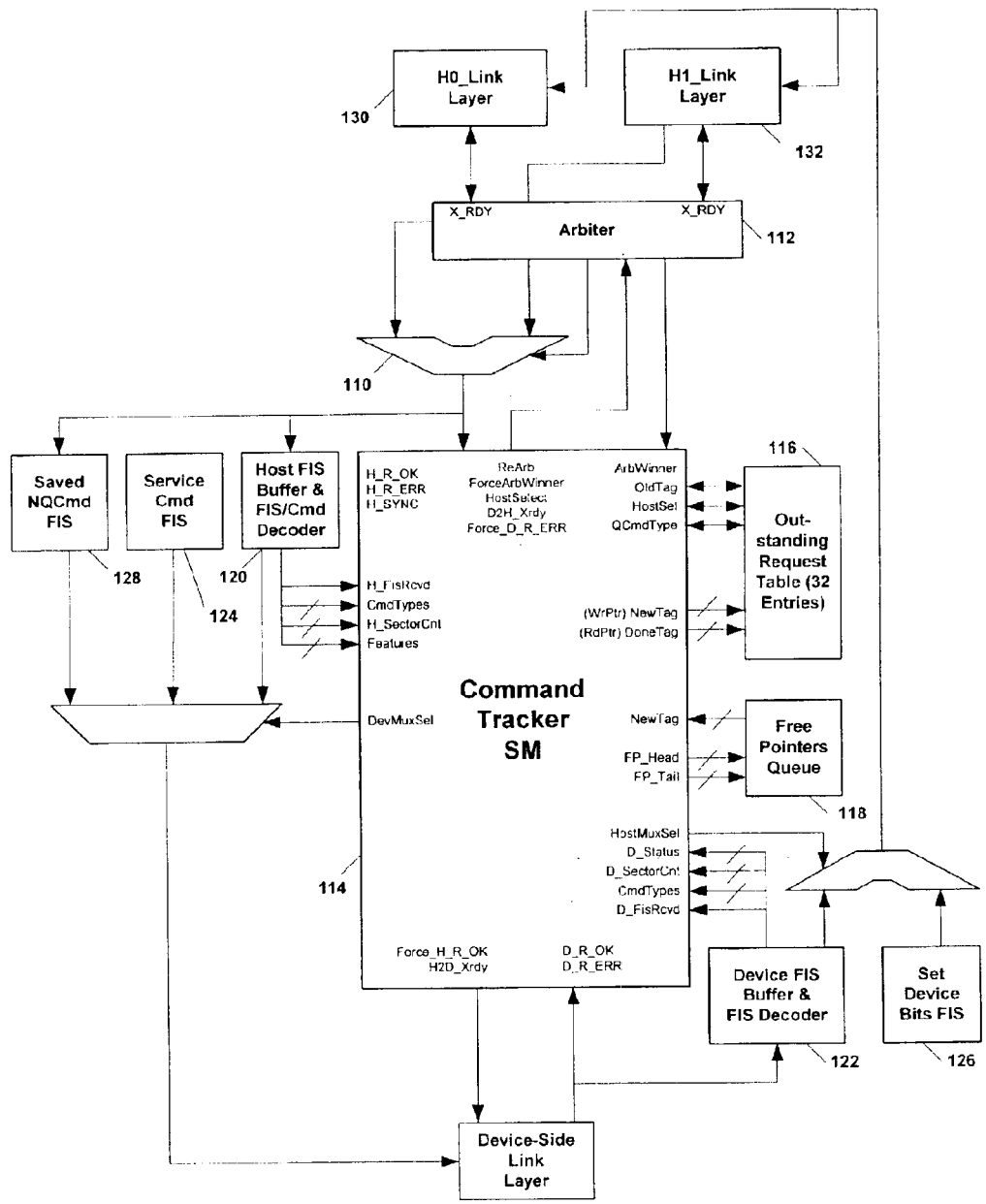
FIG. 1 is a schematic illustration of the architecture of the an exemplary embodiment of a serial ATA dual port adapter constructed in accordance with principles of the present invention.
Figure 2:
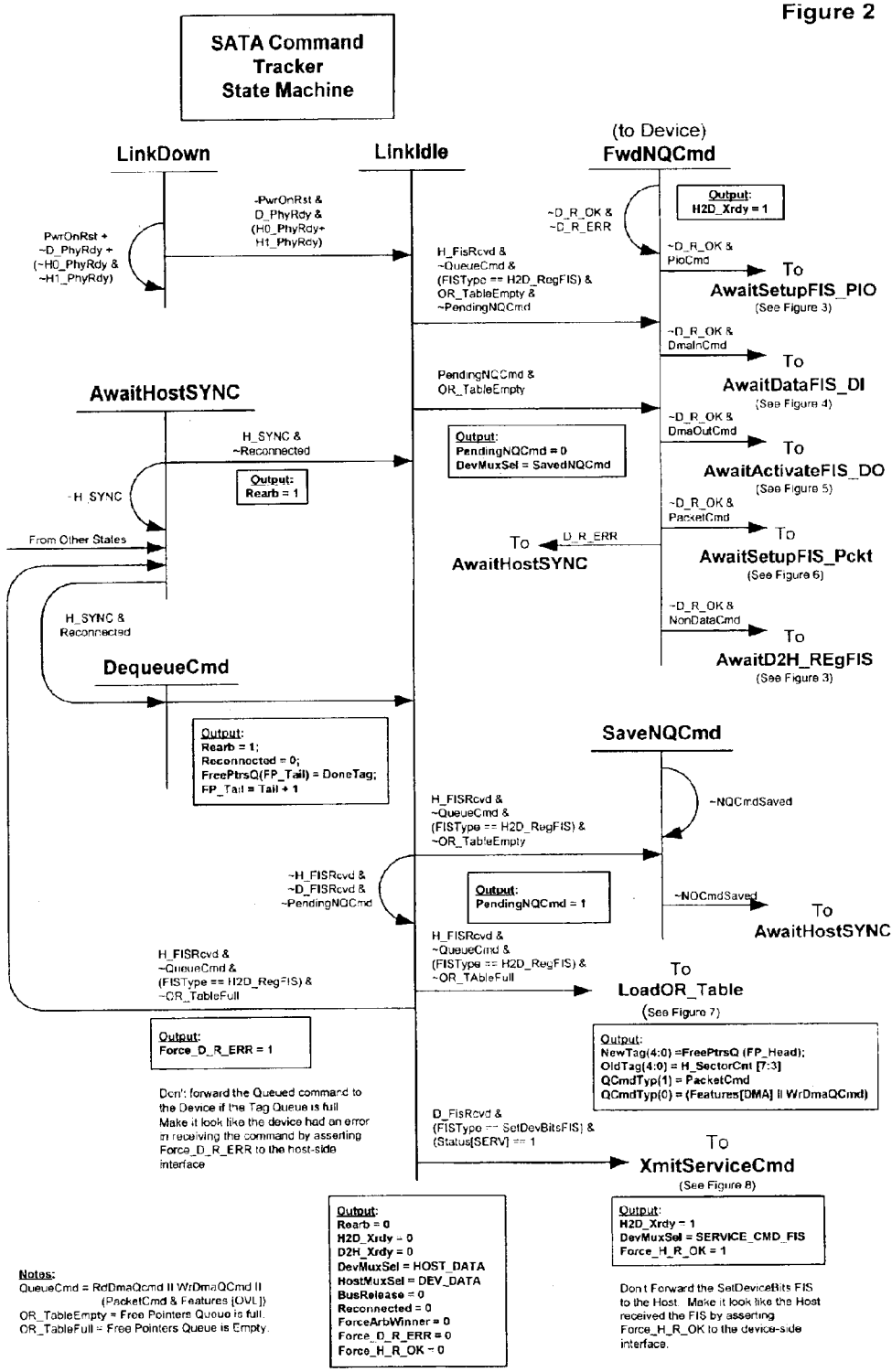
FIGS. 2–8 are state diagrams illustrating the operation of the command tracker state machine component of the adapter of the present invention.

In an exemplary embodiment, aspects of the present invention may be implemented in a device and/or method that enable two hosts to access a serial ATA drive. However one of ordinary skill in the art will recognize that principles of the present invention are readily extensible to support any number of hosts.

A dual port adapter is a device that allows two hosts (i.e., initiators) to share access to a single target device. Unlike Fibre Channel drives, which have two built in access ports, and parallel SCSI drives, which reside on a shared bus so multiple initiators have access to all drives residing on the bus, ATA drives contain a single port that only allows single initiator access. In one aspect, the present invention provides a dual port adapter that permits multi-host access to a serial ATA drive. In another aspect, the present invention provides a cost-effective mechanism to implement multi-initiator access capability to an enterprise-class ATA-based storage system.

In a parallel ATA implementation, the dual port adapter can mirror the ATA Host Protocol state machines defined in the ATAPI specification, which describe the Application Layer behavior of the Host. The Serial ATA specification contains state machines defining the Application Layer behavior of devices, but it does not contain any state machines defining the Application Layer behavior for Hosts. Therefore, a Serial ATA implementation dual port adapter cannot simply mirror the Host-side Application Layer state machines.

In a serial ATA implementation, the dual port adapter monitors activity on both the host-side and device-side links to detect the completion of a command. Link activity monitoring includes decoding incoming ATA Frame Information Structures (FIS's) that are passed up from the Link Layer state machines associated with each port, and detecting two key serial ATA primitives (R_OK and R_ERR) that indicate the completion of FIS transmissions and receptions.

To increase the overall performance capabilities of serial ATA drives in enterprise-class drive arrays, and to make serial ATA-based drive arrays more competitive with Fibre Channel, parallel SCSI, and SAS-based solutions, the serial ATA dual port adapter includes logic to support the ATA Queued Command feature set. The ATA Queued command feature set includes the following commands:

a) NOP command
b) PACKET command
c) READ DMA QUEUED command
d) WRITE DMA QUEUED command
e) SERVICE command An ATA device that supports command queuing can queue up to thirty-two PACKET, READ DMA QUEUED, and WRITE DMA QUEUED commands, depending on the depth of its command queue. These three commands include a 5-bit Tag assigned from the host to uniquely identify a specific command completion when the device completes queued commands out of order. When issuing a queued command, the host places a unique Tag in bits 7–3 of the ATA Sector Count register. In the case of PACKET commands, the Features[OVL] bit must be set to one in order for the command to be queued.

When the ATA device receives a queued command, it has the option of completing the command immediately or placing the command in its command queue and performing a bus release (which is similar to a SCSI disconnect). When a bus release is performed, the ATA device sets the Status [REL] bit to one. In a serial ATA environment, this corresponds to the device transmitting a Device-to-Host Register FIS, with the Status[REL] bit set to one.

When the ATA device is ready to complete execution of a queued command, it sets the Status[SERV] bit to one, indicating the need for a SERVICE command from a host. There are two cases in which a serial ATA device can inform a host that it is ready to complete a command. In the first case, a bus release has been performed, and the device sets the Status[SERV] bit via a Device-to-Host Set Device Bits FIS. In the second case, the device may or may not have performed a bus release, but when the device has completed the current queued command and is ready to send status back for it, it may be ready to service another previously queued command, thus setting the Status[SERV] bit for a command not associated with the command that just completed. In general, anytime a device sends back status via a Device-to-Host Register FIS for the completion of a queued command, the dual port adapter checks the Status[SERV] bit to see if another previously queued command is ready to be serviced.

Exemplary Dual Port Architecture

FIG. 1 is a schematic illustration of the basic architecture of an exemplary embodiment of a serial ATA dual port adapter constructed in accordance with principles of the present invention. The dual port adapter may be implemented as a 2-to-1 switch 110 with an arbiter module 112 providing selection control to the switch, a Command Tracker state machine 114 providing feedback to the arbitration logic in the arbiter module 112, an Outstanding Request Table (OR_Table) 116, a Free Pointers Queue 118, two inbound FIS buffers (120, 122) for storing and decoding incoming FIS's from the hosts and device, respectively and two outbound FIS buffers (124, 126) for generating the necessary control on the links to overcome limitations with ATA command queuing in a multi-initiator environment. Outbound FIS buffers 124, 126 include FIS's that are sent to the device and host, respectively, to overcome limitations associated with ATA command queuing in a multi-initiator environment.

The dual port adapter also includes a Saved Non-Queued Command FIS buffer 128 that allows a host to post a single, non-queued command if another host currently has outstanding queued commands. This prevents the ATA device from aborting all the queued commands when it receives a non-queued command. The saved command gets forwarded to the ATA device after all of the queued commands have been serviced and the Free Pointers Queue 118 is full. The multiplexers either pass through primitives and FIS's from one side of the DPA to the other, or send DPA-specific FIS's that are necessary to overcome the limitations associated with ATA command queuing in a multi-initiator environment.

The arbitration logic in the arbiter module 112 assigns a priority scheme to received commands. In an exemplary embodiment, the arbiter module 112 detects X_RDY primitives from the Link Layer state machines of each host port 130, 132 as the requests to gain access to the device. The arbiter module 112 may assign priority to incoming commands from competing hosts according to a round-robin arbitration policy. When the Command Tracker state machine 114 detects that the serial ATA device has completed execution of a command (ReArb), the arbiter module 112 swaps the priorities of the requests from the Link Layer state machines of each host port 130, 132, giving the lowest priority to the recently serviced host and the highest priority to the other host. One of ordinary skill in the art will readily appreciate that other arbitration schemes could be implemented.

OR_Table 116 may be implemented as a memory table for storing identifying information associated with commands received from the hosts. In an exemplary embodiment, OR_Table 116 includes a data table that stores the original Tag associated with each outstanding command, the originating source of each outstanding command (i.e., Host 0 or Host 1), and the type of queued command (i.e, Read DMA, Write DMA, Packet DMA, or Packet PIO).

The Free Pointers Queue 118 may be implemented as a list of 32 slots that are available in the OR_Table 116. When the dual port adapter is powered-up, the Free Pointers Queue 118 may be initialized so each entry contains a unique 5-bit index into the OR_Table. The Command Tracker state machine can manage the head and tail pointers (FP_Head and FP_Tail) to the Free Pointers Queue 118. At power-up time, FP_Head and FP_Tail may be initialized such that the Free Pointers Queue is full, indicating 32 available slots in the OR_Table.

The Command Tracker state machine 114 determines when a received command has been completed by the serial ATA device and updates the memory modules to reflect completion of the command. The Command State tracker machine 114 may use serial ATA FIS's and primitives that it receives from the Device-side and Host-side Link Layer state machines to determine when a command received from a Host port (130,132) has been completed by the serial ATA device. It also communicates with the OR_Table 116 and Free Pointers Queue 118 to assign unique new tags to incoming commands from a host.

The arbitration module 112 may implement an exception to the round-robin arbitration policy when a queued command has been sent to the serial ATA device and the serial ATA device is ready to complete the command. When this occurs, the Command Tracker state machine 114 opens up the Device-to-Host Register FIS or PIO Setup FIS received from the device (in response to a Service command) to determine the Tag associated with the queued command. The Tag retrieved from the Device-to-Host Register FIS or PIO Setup FIS may be used as an index into the OR_Table, from which the Command Tracker state machine can determine (1) which host the command originated from, and (2) what type of queued command is to be serviced. Then the Command Tracker state machine can assert a ForceArbWinner signal and a HostSelect signal indicating which Host the arbitration logic should allow a connection to the device.

When the Command Tracker state machine 114 decodes an incoming queued command from the host-side of the dual port adapter, it receives a pointer to an available slot in the OR_Table 116 via the contents at the head of the Free Pointers Queue 118. It then loads this entry of the OR_Table 116 with the original Tag, host, and command type. If the serial ATA device performs a bus release on this command, then the Command Tracker state machine 114 finalizes the queuing of the command by incrementing the head of the Free Pointers Queue 118. When the Command Tracker state machine 114 detects the completion of a queued command, it retrieves the Tag from the Sector Count register on the device-side of the dual port adapter, pushes it on to the tail of the Free Pointers Queue 118, and increments the tail.

FIGS. 2 through 8 illustrate the operation of the Command Tracker state machine 114. These figures follow the conventions used in the ATAPI specifications for state diagrams. Input signals with a prefix of "H_" originate from the host-side interface to the dual port adapter, while those with a prefix of "D_" originate from the device side of the dual port adapter.

At Power-On reset time, the state machine starts in the LinkDown state. When the device-side link of the dual port adapter and at least one host-side link of the dual port adapter have completed their power-up sequence and speed negotiations the state machine transitions to the LinkIdle state. Except for the transition from LinkDown to LinkIdle, all other transitions into the LinkIdle state should result in the Rearb signal being asserted for one clock to inform the arbitration logic that a command has just completed and that a new arbitration cycle can begin.

Figure 3:
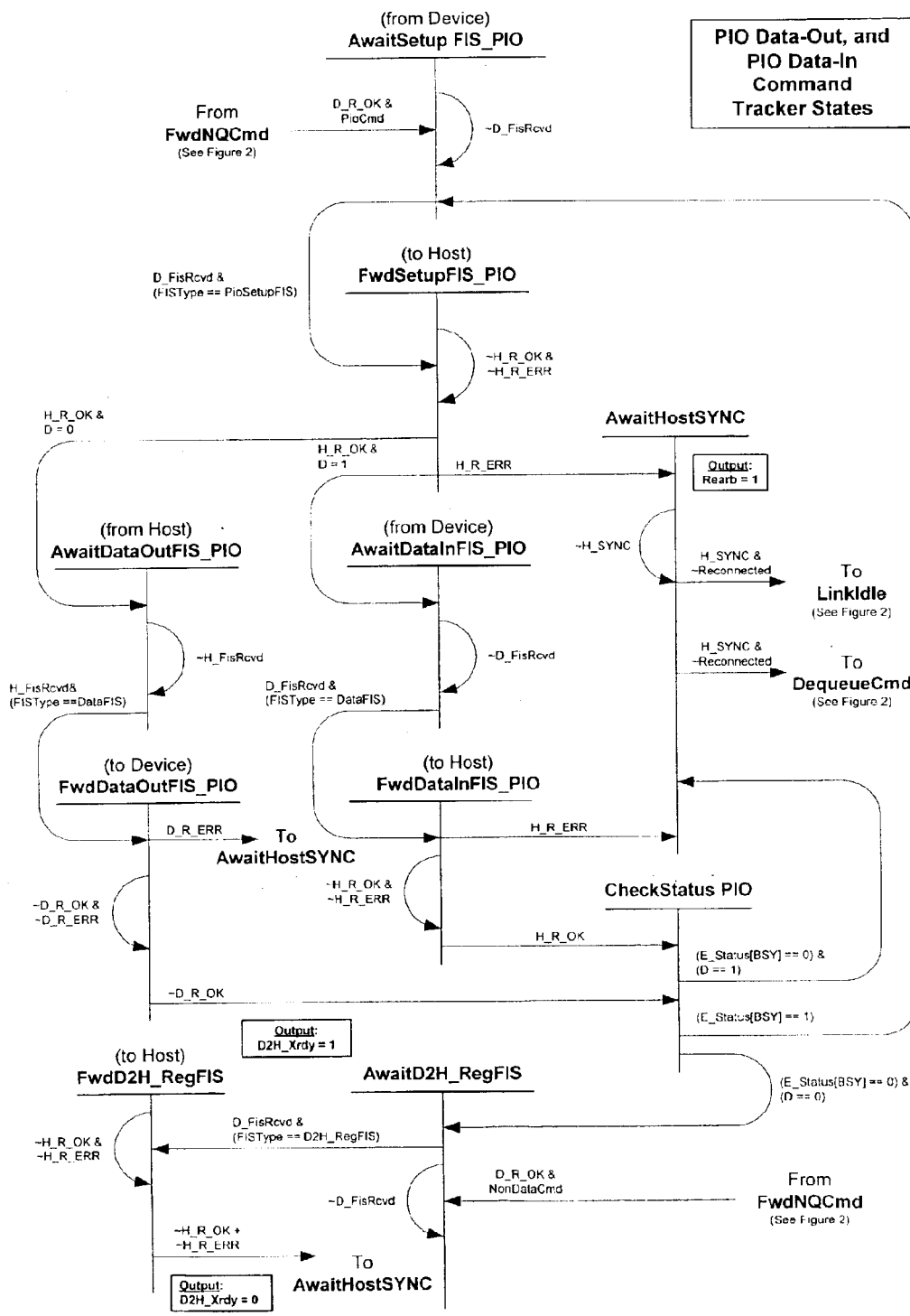

While in the LinkIdle state, the state machine waits for an incoming FIS from either the host side or the link side of the dual port adapter. Separate command/FIS decode modules outside of the state machine inform the Command Tracker the type of FIS received, and the type of command detected in the ATA Command Register field of Host-to-Device Register FIS's. The commands defined in the ATAPI specification can be broken into eleven major categories:
1) Non-Data commands
2) PIO Data-In commands
3) PIO Data-Out commands
4) DMA Data-In commands
5) DMA Data-Out commands
6) Packet PIO commands
7) Packet DMA commands
8) Queued Packet PIO commands
9) Queued Packet DMA commands
10) Queued DMA Data-In commands
11) Queued DMA Data-Out commands Non-Data Commands The Command Tracker states associated with Non-Data commands are shown in FIG. 3. Non-Data commands include commands such as EXECUTE DIAGNOSTICS, DEVICE RESET, SET FEATURES, etc. A write to the ATA Control register to set the SRST bit also falls under this category. These types of commands do not involve the transfer of any Data FIS between the Host and the Device. They do, however, involve an initial Host-to-Device Register FIS transfer (state FwdNQCmd), followed by a Device-to-Register FIS transfer (state FwdD2H_RegFIS) after command completion.

Programmed I/O Commands

The Command Tracker states associated with PIO Data-In commands are shown in FIG. 3. Programmed I/O Data-In commands include IDENTIFY DEVICE, READ SECTOR (S), READ MULTIPLE, etc. These commands involve the initial transfer of the command from the host to the device via a Host-to-Device Register FIS (state FwdNQCmd), followed by a PIO Setup FIS from the device to the host (state FwdSetupFIS_PIO), followed by a Data FIS from the device to the host (state FwdDataInFIS_PIO). If multiple Data FIS's are required to be sent to the host, then the device precedes each Data FIS with a PIO Setup FIS. The PIO Setup FIS is similar to a Device-to-Host Register FIS in that it provides a beginning and ending status (E_Status) prior to each data transfer. The last data transfer for a PIO Data-In command is determined when the BSY bit of the E_Status register is cleared to zero (state ChkStatusDataIn_PIO). All other data transfers prior to the last one will have E_Status [BSY] set to one. The dual port adapter must save a copy of the E_Status register upon the reception of the PIO Setup FIS from the device. It then checks the status of the BSY bit when the end of the Data FIS transmission is detected, e.g., via the reception of the R_OK or the R_ERR primitive from the Host side of the dual port adapter.

The Command Tracker states associated with PIO Data-Out commands are shown in FIG. 3. PIO Data-Out commands include WRITE BUFFER, WRITE SECTOR(S), WRITE MULTIPLE, etc. These commands involve the initial transfer of the command from the host to the device via a Host-to-Device Register FIS (state FwdNQCmd), followed by a PIO Setup FIS from the device to the host (state FwdSetupFIS_PIO), followed by a Data FIS from the host to the device (state FwdDataOutFIS_PIO). If multiple Data FIS's are required to be sent by the host, then the device precedes each Data FIS with a PIO Setup FIS. The PIO Setup FIS is similar to a Device-to-Host Register FIS in that it provides a beginning and ending status (E_Status) prior to each data transfer. PIO Data-Out commands differ from PIO Data-In commands in two ways. First, each PIO Setup FIS sent by the SATA device always has E_Status [BSY] set to one and E_Status[DRQ] cleared to zero for each Data FIS that is to be received, regardless of whether or not it is for the final data transfer. Second, the serial ATA device sends a final Device-to-Host Register FIS after the final data transfer, since there is a possibility that an error can occur during the final transfer of data to the device's internal media. This implies that the Command Tracker cannot detect the completion of a PIO Data-Out command based on the state of the E_Status[BSY] bit after each Data FIS transfer. Instead, the Command Tracker determines that the PIO Data-Out command has completed upon detection of a D2H Register FIS after a H2D Data FIS.

DMA Commands (Non-Queued)

Figure 4:
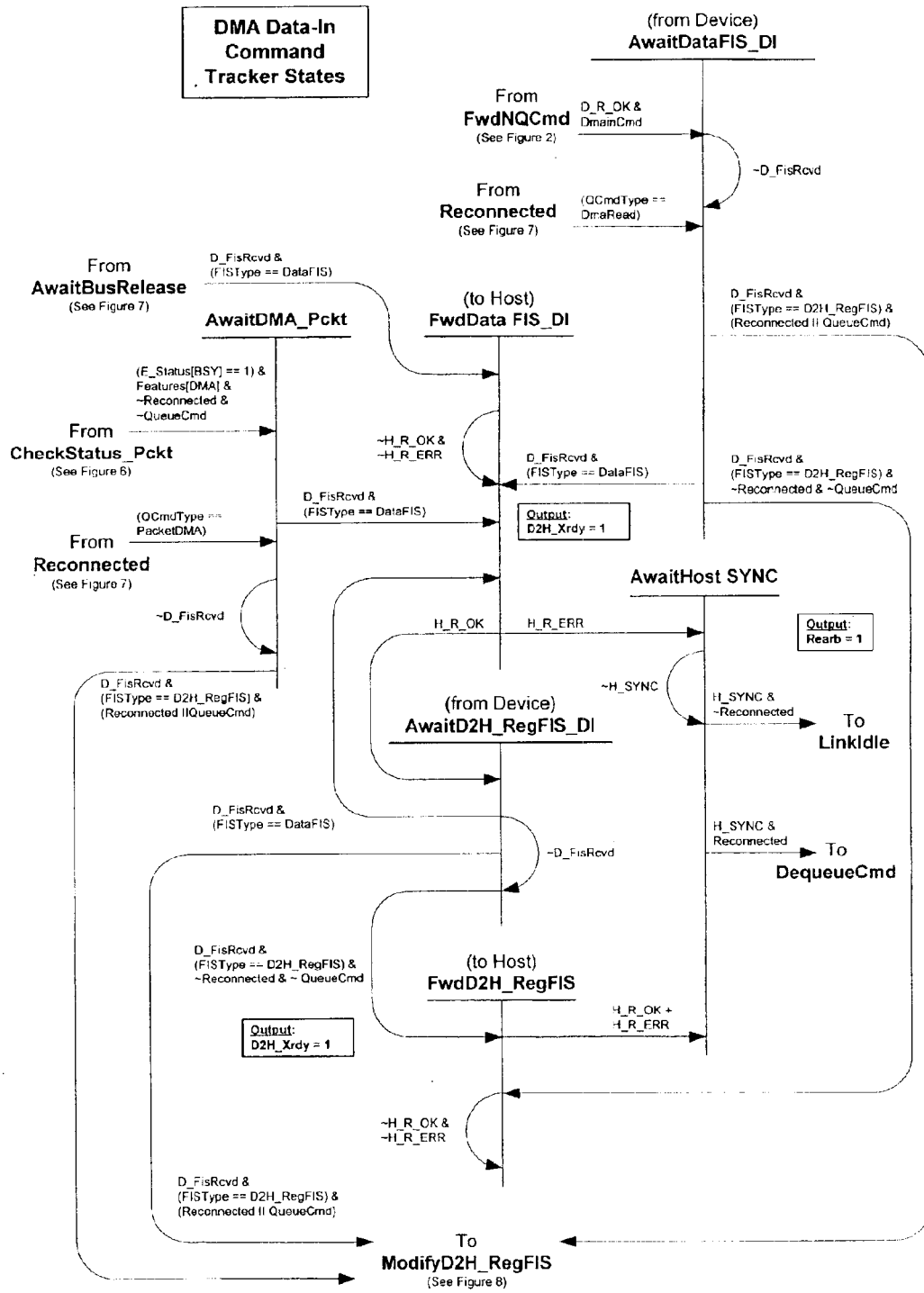

The Command Tracker states associated with DMA Data-In commands are shown in FIG. 4. DMA Data-In commands include READ DMA and READ DMA EXT. These commands involve the initial transfer of the command from the host to the device via a Host-to-Device Register FIS (state FwdNQCmd) followed by one or more Data FIS's from the device to the host (state FwdDataFIS_DI). After the last Data FIS has been transferred to the host, the device sends a Device-to-Host Register FIS to the host to indicate the final status of the command (state FwdD2H_RegFIS). The dual port adapter detects the completion of the transfer of each Device-to-Host FIS, e.g., via the reception of the R_OK or the R_ERR primitive from the Host side of the dual port adapter. At the end of each Device-to-Host Data FIS, the Command Tracker state machine 114 waits for the reception of a Device-to-Host Register FIS (state AwaitD2H_RegFIS_DI), which is an indication that the DMA Data-In command has completed.

Figure 5:
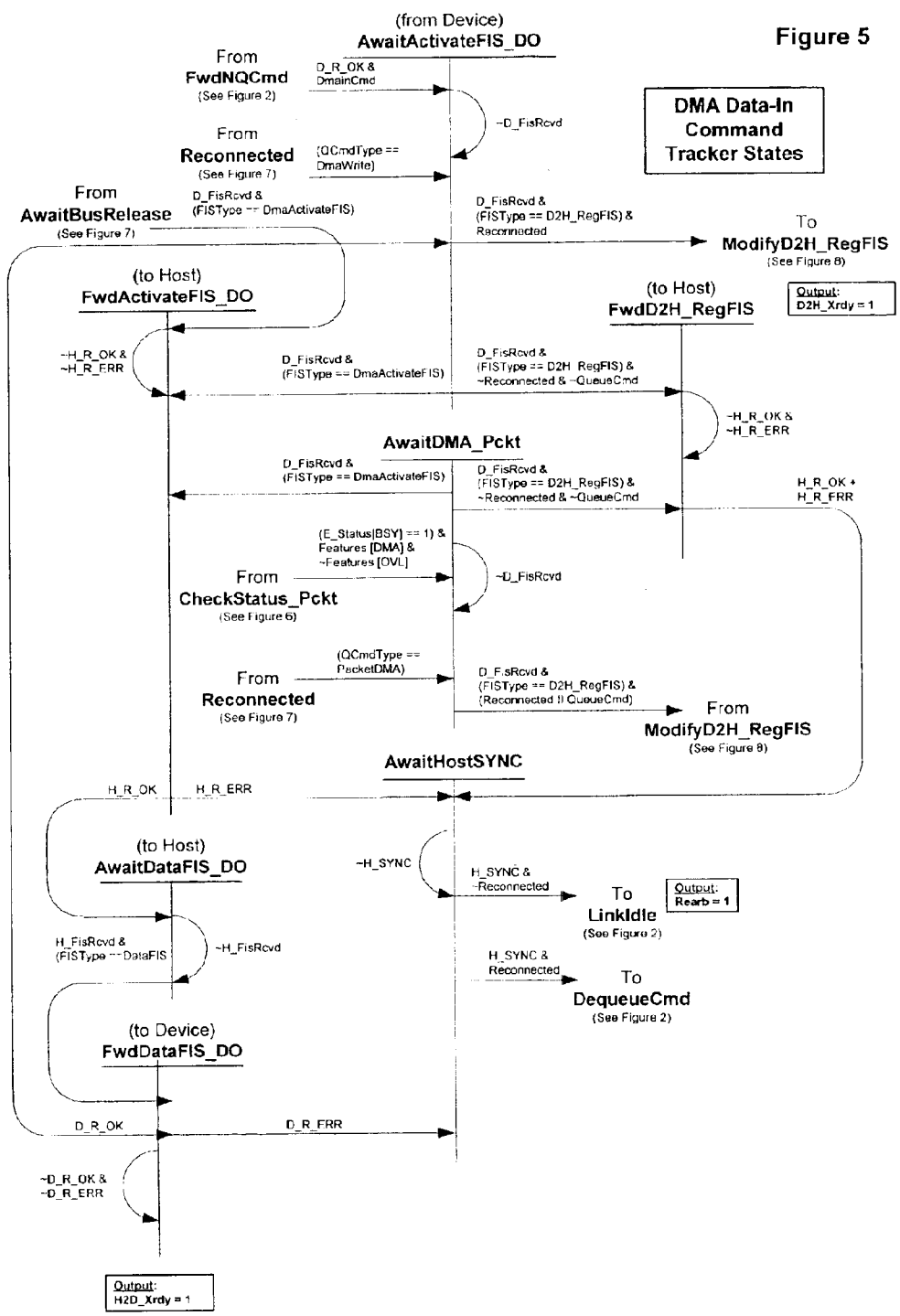

The Command Tracker states associated with DMA Data-Out commands are shown in FIG. 5. DMA Data-Out commands include WRITE DMA and WRITE DMA EXT. These commands involve the initial transfer of the command from the host to the device via a Host-to-Device Register FIS (state FwdNQCmd), followed by a DMA Activate FIS from the device to the host (state FwdActivateFIS_DO), followed by one or more Data FIS's (state FwdDataFIS_DO) from the host to the device. If multiple Data FIS's are required for the command, then the device will precede each data transfer with a DMA Activate FIS sent to the host. After the last Data FIS has been transferred to the host, the device sends a Device-to-Host Register FIS to the host (state FwdD2H_RegFIS) to indicate the final status of the command. The dual port adapter detects the completion of the transfer of each Host-to-Device FIS via the reception of the R_OK or the R_ERR primitive from the Device side of the dual port adapter. At the end of each Host-to-Device Data FIS, the Command Tracker state machine waits for the reception of another DMA Activate FIS from the device, which indicates at least one more Data FIS transfer, or a Device-to-Host Register FIS, which is an indication that the DMA Data-Out command has completed.

Packet Commands (Non-Queued)

Figure 6:
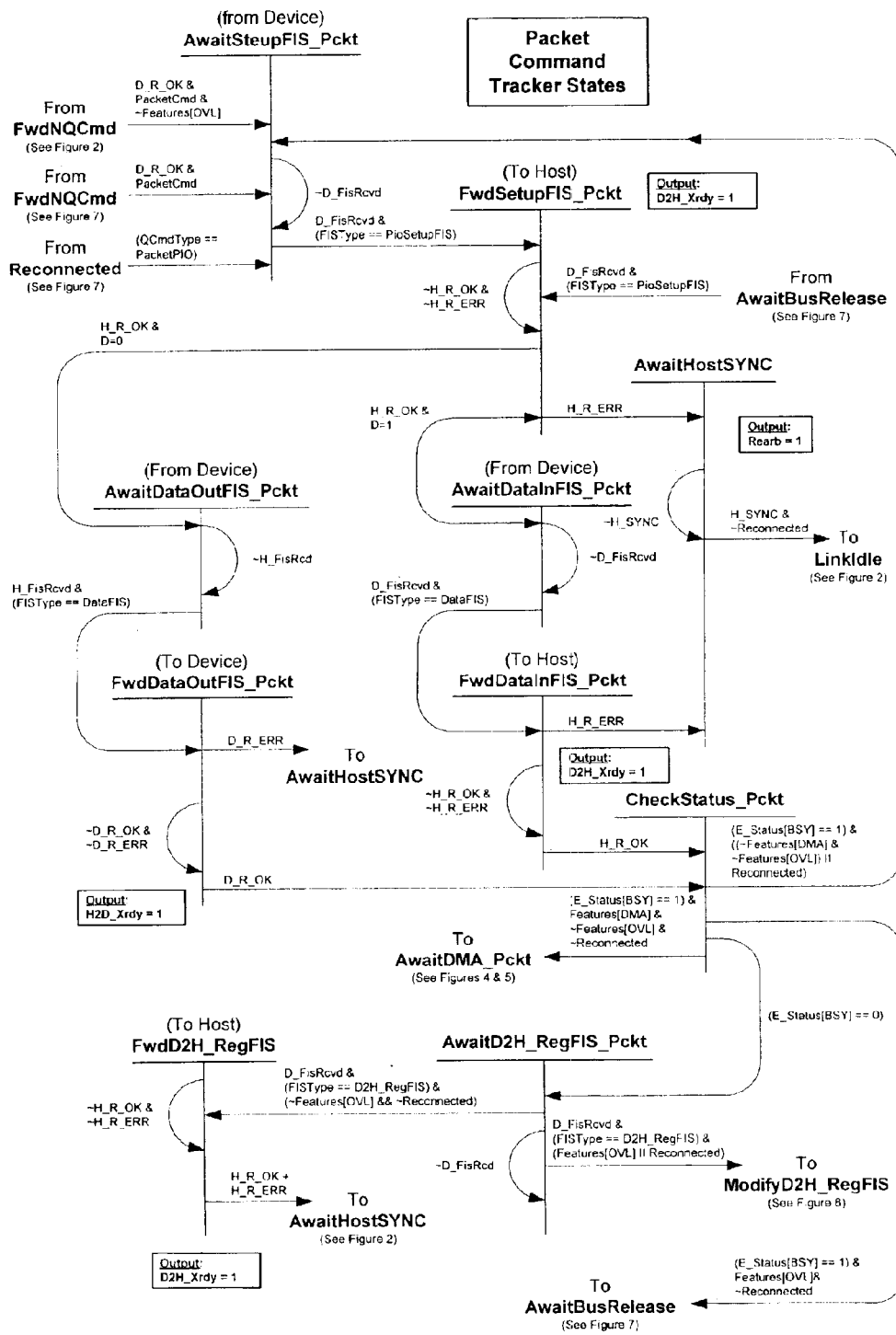

The Command Tracker states associated with Packet commands are shown in FIG. 6. Packet commands are typically vendor-specific commands that require too many bytes to fit into the ATA register set. Instead of putting the command parameters in the ATA registers, the command and command parameters are transferred from the host to the ATA device using PIO Data-Out protocol. Packet commands therefore have two phases—a command transfer phase and a data transfer phase. The command transfer is always performed using PIO Data-Out protocol. The data transfer phase is performed using either DMA protocol or PIO protocol. If the DMA bit of the ATA Features register is set, then DMA protocol is used to perform the data transfer. Packet commands can also be overlapped or queued by setting the OVL bit in the ATA Features register.

With packet commands, the host loads the command and command parameters into a command packet buffer, then writes the PACKET command to the ATA Command register. The write to the Command register initiates a Host-to-Device Register FIS that is forwarded through the dual port adapter to the ATA device (state FwdNQCmd if Features [OVL] is cleared or state FwdQCmd if Features[OVL] is set).

When the ATA device detects the PACKET command, it responds with a PIO Setup FIS with the "D" bit set to 0, which the dual port adapter forwards to the host side (state FwdSetupFIS_PcktCMD) interface. The host then transfers the contents of the command packet buffer data using PIO Data-Out protocol, and the dual port adapter forwards the command packet to the device (state FwdCmdOutPckt). From there, the dual port adapter determines the expected FIS sequence based on the state of the OVL and DMA bits in the ATA Features register.

After the command packet has been successfully transferred to the SATA device using PIO Data-Out protocol, if the Features[OVL] bit is cleared and the Features[DMA] bit is cleared, then the command is not queued, and the device and host will use PIO protocol to perform the data transfer. In this case, the dual port adapter waits for the device to send another PIO Setup FIS (state AwaitSetupFIS_PcktData) and forwards it to the host when it arrives (state FwdSetupFIS_PcktData). Then the Command Tracker waits for a Host-to-Device Data FIS if the "D" bit was cleared, or it waits for a Device-to-Host Data FIS if the "D" bit was set. The incoming Data FIS is then transferred to the other side of the dual port adapter. When the transfer is complete ($D_R\_OK$ or $H\_R\_OK$), the Command Tracker loops back to state AwaitSetupFIS_PcktData, where it waits for either another PIO Setup FIS or a D2H Register FIS from the SATA device. If a PIO Setup FIS is received, then there are more data transfers to be done, and the Command Tracker forwards the PIO Setup FIS (state FwdSetupFIS_PcktData).) to the host and then prepares to send or receive more Data FIS's in state AwaitDataOutFIS_PcktPIO or AwaitDataInFIS_PcktPIO. If a D2H Register is received, then the final data transfer for the packet command has completed, and the Command Tracker forwards a final status for the packet command to the host (state FwdD2H_RegFIS). Then, the Command Tracker waits for SYNCs on the host side of the dual port adapter in state AwaitHostSYNC.

After the command packet has been successfully transferred to the SATA device using PIO Data-Out protocol, if the Features[OVL] bit is cleared and the Features[DMA] bit is set, then the command is not queued, and the host and device will use DMA protocol to perform the data transfer. In this case the dual port adapter waits for the device to send an Activate DMA FIS, a Device-to-Host Data FIS, or a Device-to-Host Register FIS (state AwaitDMA_Pckt). The dual port adapter cannot determine which direction the data transfer should be until the device side of the dual port adapter receives one of these FIS's. If a DMA Activate FIS is detected, then the data transfer is from the host to the device, and the Command Tracker will use the states associated with DMA Data-Out transfers to perform the data transfers (See FIG. 5). If a Device-to-Host Data FIS is detected, then the Command Tracker will use the states associated with DMA Data-In transfers to perform the data transfer (See FIG. 4). If a Device-to-Host Register FIS is detected, then there must have been an error with the command packet, so the device is sending an error status and the Command Tracker forwards the status to the host in state FwdD2H_RegFIS.

Queued Commands

Figure 7:
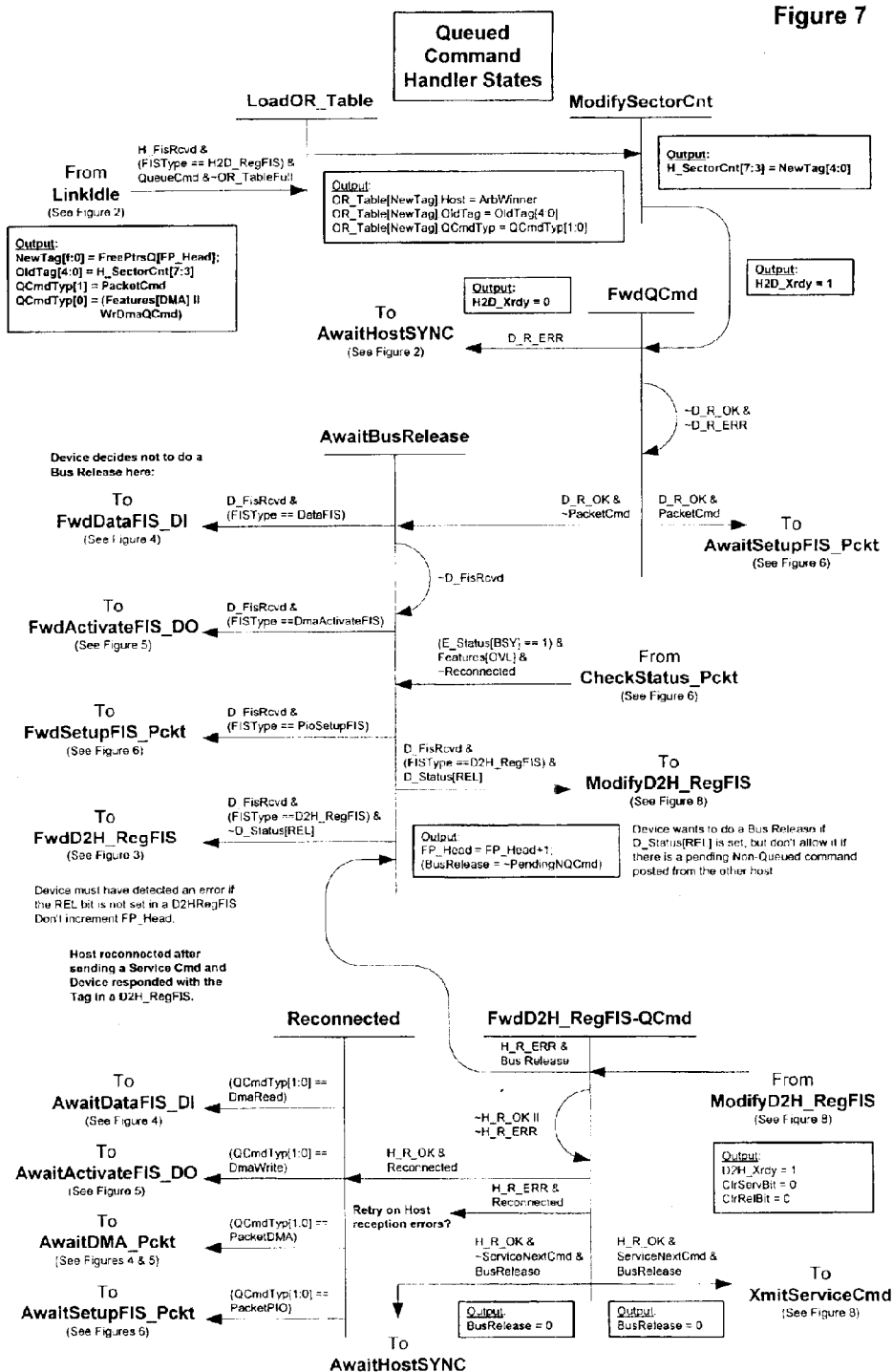
Figure 8:
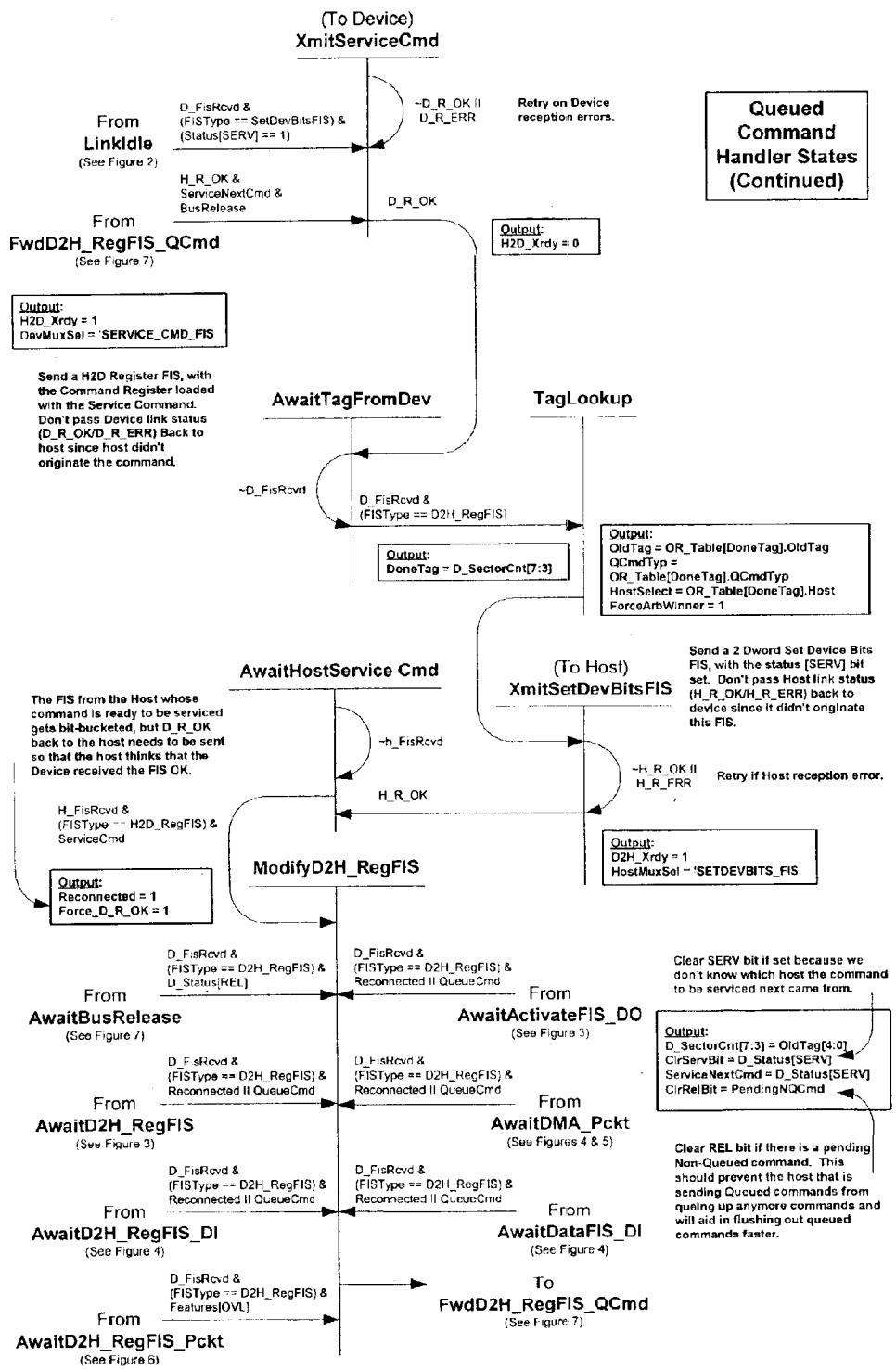

The states associated with queued commands are shown in FIGS. 7 and 8. Queued commands include READ DMA QUEUED (EXT), WRITE DMA QUEUED (EXT), and PACKET commands (which have the Features[OVL] bit set). There are several sections of the Command Tracker state machine used to control and track queued commands:

1) New Tag assignments
2) Insertion of Outstanding Requests to the OR_Table
3) Command Modification & Forwarding to Device
4) Bus Release procedures
5) Reconnection procedures
6) Removal of Outstanding Requests from the OR_Table New Tag Assignment When the Command Tracker detects an incoming queued command from the host-side interface of the dual port adapter, a new Tag is assigned to the command to guarantee uniqueness of Tags between multiple initiator commands. The contents at the Head of the Free Pointers Queue (FreePtrsQ) contains a 5-bit pointer to an available entry into the Outstanding Request Table (OR_Table), where information associated with the current queued command can be stored. The NewTag for the queued command is assigned to the pointer contained in FreePtrsQ[FP_Head] during the transition from state LinkIdle to state LoadOR_Table.

Insertion of Outstanding Requests to the OR_Table

Information about the queued command must be stored in the OR_Table so that if the device performs a bus release for the command, the Command Tracker can determine how to reconnect the device to the correct host and figure out what type of FIS's to expect when the device is ready to complete the command. The information stored in the OR_Table may include the OldTag[4:0], the Host that sent the command, and the type of queued command. OldTag[4:0] is retrieved from the ATA Sector Count register field of the H2D Register FIS. The Host that sent the command is determined from the ArbWinner signal from the arbitration block. The command type is encoded in a 2-bit variable, QcmdTyp[1:0] as follows:

| Command Type | QcmdTyp[1:0] |
| --- | --- |
| Read DMA Queued | 00 |
| Write DMA Queued | 01 |
| Packet w/PIO Queued | 10 |
| Packet w/DMA Queued | 11 |

The new information for the OR_Table is loaded at OR_Table[NewTag] during state LoadOR_Table.

Command Modification & Forwarding to Device

After the OR_Table has been loaded, the H2D Register FIS with the new queued command is modified to replace the original Tag with the NewTag in state ModifySectorCnt.

Once the H_SectorCnt[7:3] field has been modified, the H2D Register FIS is forwarded to the device-side interface of the dual port adapter in state FwdQCmd. Since the Register FIS has been modified, a new 32-bit CRC must be generated by the dual port adapter. However, since the Link Layer is responsible for generating CRCs, the Command Tracker state machine 114 does not need to regenerate the new CRC.

If the device detects an error during the reception of the modified H2D Register FIS (D_R_ERR asserted), the Command Tracker will transition to state AwaitHostSYNC, where it will wait until a SYNC primitive is detected from the host-side interface of the dual port adapter. The command does not need to be removed from the OR_Table if this happens because the FP_Head pointer will not be incremented until the device has successfully received the modified H2D Register FIS. Therefore, when a new queued command is received, the Command Tracker will reuse the NewTag from the previous command that had errors, and overwrite the old entry in the OR_Table.

If the device successfully receives the modified H2D Register (D_R_OK asserted), the Command Tracker determines whether the queued command was a PACKET command or not. Packet commands are a special case, because the real command packet has not been transferred to the device yet—only the ATA PACKET command has been transferred. The host still has to transfer the command portion of the command to the device using PIO Data-Out protocol before the device can queue the command. Therefore, if a PACKET command was successfully forwarded to the device, the state machine transitions to state AwaitSetupFIS_PcktCmd, and the flow for tracking Packet commands follows. If the queued command was not the PACKET command, the state machine transitions to state AwaitBusRelease, where it waits to see if the device is going to perform a bus release.

Bus Release Procedures

The device performs a bus release by transmitting a D2H Register FIS with the REL bit set in the ATA Status register (D_Status[REL]). This can be thought of as a Bus Release Request from the device. There is a problem with multi-initiator support, however, because the device can perform a bus release and inform the host that a previous queued command is ready to be serviced (D_Status[SERV]==1), at the same time. The setting of the D_Status[SERV] bit by the device can be thought of as a Bus Reconnection Request from the device. An ATA device is capable of making both a Bus Release Request and a Bus Reconnection Request simultaneously, but the two requests may need to be routed to two different hosts. Therefore, before the dual port adapter forwards the D2H Register FIS to the host that is going to be bus released, the D_Status[SERV] bit has to be cleared so that the wrong host is not incorrectly informed of a Bus Reconnection Request. The Command Tracker state machine takes measures to determine the correct host to reconnect to if the D_Status[SERV] bit is set. These measures are described below in the Bus Reconnection Procedures section.

If the REL bit in the ATA Status register (D_Status[REL]) is set when the state machine detects a D2H Register FIS in state AwaitBusRelease, the Command Tracker state machine transitions to state ModifyD2H_RegFIS. It also increments the FP_Head pointer to the Free Pointers Queue by one, effectively making the entry in the OR_Table valid for the current queued command, since the entry pointer is no longer available or "free" for future queued commands to use until the command completes. The BusRelease flag is set in this state if D_Status[REL] is set and there is not a pending Non-Queued command that has been posted into the dual port adapter.

If there is currently a posted Non-Queued command residing in the SavedNQCmd buffer, the dual port adapter will prohibit the current queued command to be bus released, e.g., by clearing the D_Status[REL] bit before the D2H Register FIS is forwarded to the currently connected host. This prevents the currently connected host from issuing any further queued commands to flush out the queued commands as quickly as possible so that the Non-Queued command has a better chance of being serviced before timing out. A host is not allowed to issue any new queued commands until either it is bus released by the device, or the device completes the newly issued command. If the host never sees the REL bit set, it will not be allowed to issue any more queued commands.

While in state ModifyD2H_RegFIS, the D_Status[SERV] bit is cleared if currently set, for reasons described above. The ServiceNextCmd flag is also set if the D_Status[SERV] bit is set, This indicates to the Command Tracker to come back later to determine to which host the Bus Reconnection Request shall be forwarded. Also in this state, the D_SectorCnt[7:3] register is modified to replace the Tag from the device (which the dual port adapter assigned), with the OldTag from the original command, so that when the D2H Register FIS is forwarded to the host, the Tag that is returned to the host agrees with the original Tag that was issued from the host.

Next, the state machine transitions from state ModifyD2H_RegFIS to state FwdD2H_RegFIS_QCmd. In this state, the dual port adapter forwards the D2H Register FIS to the currently connected host. If the host receives the FIS without any errors (H_R_OK), then the bus release procedure is completed. Otherwise, if the host detects an error with the FIS (H_R_ERR), then the error indication should flow through the dual port adapter, back to the device. This should cause the device to resend the original D2H Register FIS for the bus release, and the procedures described above should be repeated until the host successfully receives the FIS with a bus release request.

If the REL bit in the ATA Status register is not set when the state machine detects a D2H Register FIS in state AwaitBusRelease, then the device must have detected an error with the command parameters and is not going to execute the command. In this case, the Command Tracker does not increment the FP_Head pointer to the Free Pointers Queue, since it will reuse the current NewTag for the next queued command, and the state machine transitions to state FwdD2H_RegFIS, where the command completes just as if it were a non-queued command.

If a D2H Register FIS is not received while in state AwaitBusRelease, but another FIS type is detected, then the device must be ready to complete the command immediately, and will not be performing a bus release. If this happens, the state machine transitions to state FwdDataFIS_DI if a Data FIS is detected, state FwdActivateFIS_DO if a DMA Activate FIS is detected, or state FwdSetupFIS_Pckt if a PIO Setup FIS is detected.

Bus Reconnection Procedures

Bus Reconnection Requests may be made by the device when the D_Status[SERV] bit is set within either a D2H Set Device Bits FIS or a D2H Register FIS. The Command Tracker state machine is responsible for making sure that the Bus Reconnection Request is routed to the correct host.

When the Command Tracker state machine detects a Bus Reconnection Request from the device, it transitions to state XmitServiceCmd. In this state, the state machine sets up the data path mux on the device side of the dual port adapter to point to a pre-built H2D Register FIS which has the ATA Command Register field loaded with the ATA SERVICE command. An external state machine is instructed to perform the handshaking to transfer the FIS down to the Link Layer on the device side of the dual port adapter. The Command Tracker monitors the completion of the transfer of this FIS to the device by looking for D_R_OK or D_R_ERR primitives, but the dual port adapter will not forward any primitives from the device to the host-side interface because the Service Command FIS was generated internally by the dual port adapter. The state machine re-transmits the SERVICE Command FIS if it detects D_R_ERR from the device. If D_R_OK is detected, the Command Tracker transitions to state AwaitTagFromDev. Here it waits to receive a D2H Register FIS or PIO Setup FIS containing a Tag value in the D_SectorCnt register, since the Serial ATA command queuing protocol requires the device to respond to a SERVICE command with a D2H Register FIS with the Tag of the pending command located in the Sector Count register.

Upon receipt of the D2H Register FIS or PIO Setup FIS in state AwaitTagFromDev, the Command Tracker loads the DoneTag[4:0] variable with the contents of D_SectorCnt [7:3], and the state machine transitions to state TagLookup. In state TagLookup, the DoneTag value may be used to index into the OR_Table, from which the OldTag[4:0], QCmdTyp[1:0] and HostSelect variables may be loaded. This is how the Command Tracker determines which host the device is trying to reconnect to in order to complete the command. ForceArbWinner signal may be asserted in this state to inform the arbitration logic to open a connection between the device and the host specified by the HostSelect variable.

It will be noted that the dual port adapter does not operate in a pass-thru mode in this state. In other words, it does not pass the X_RDY primitives from the device up to the host, and then pass the R_RDY primitive from the host down to the device. The Link Layer of the dual port adapter has the intelligence built in such that it is capable of decoding and generating SATA primitives Also note that the D2H Register FIS or PIO Setup FIS is not forwarded to the host side of the dual port adapter yet, because the host has not been notified of a Reconnection Request from the dual port adapter, which is done in the next state, XmitSetDevBitsFIS.

In this state, the state machine sets up the data path mux on the host side of the dual port adapter to point to a pre-built D2H Set Device Bits FIS, which has the D_Status[SERV] bit set. An external state machine is instructed to perform the handshaking to transfer the FIS to the Link Layer on the host side of the dual port adapter. The Command Tracker monitors the completion of the transfer of this FIS to the host by looking for H_R_OK or H_R_ERR primitives. The state machine re-transmits the FIS if it detects H_R_ERR. Any primitives received from the host on the back channel during the transmission of this FIS are not forwarded to the device-side interface of the dual port adapter since the FIS was generated internally.

If the D2H Set Device Bits FIS is transferred without errors to the host that is being reconnected, then the state machine transitions to state AwaitHostServiceCmd, where it waits to receive an H2D Register FIS with the SERVICE command loaded in the ATA Commmand register field. The ATA queued command protocol requires a host to send the SERVICE command in response to the Status[SERV] bit being set. When the state machine detects the SERVICE command from the host, the dual port adapter considers the reconnection to be established, and it sets the Reconnected flag. Since the device has already seen the SERVICE command that was generated by the dual port adapter, there is no need to forward the SERVICE command FIS that was received from the reconnecting host down to the device.

Next, the state machine transitions to state ModifyD2H_RegFIS, where the original tag from the command (OldTag) is loaded into the Sector Count Register field of the D2H Register FIS or PIO Setup FIS that was received during state AwaitTagFromDev. At this point the dual port adapter is ready to send the device's response to the SERVICE command to the reconnected host, using the original Tag sent by the host, rather than the Tag that was assigned by the dual port adapter. This is done so that the host can reload the correct data pointers, byte count, and directional indicator for the command that is ready to be executed. Once the Sector Count register has been updated with the original Tag, the state machine transitions to state FwdD2H_RegFIS_QCmd.

In state FwdD2H_RegFIS_QCmd, the Command Tracker waits for the host to receive the "Tag-modified" response to the SERVICE command. When the state machine detects H_R_OK in this state, with the Reconnected flag set, the state machine transitions to the Reconnected state, where the queued command type is decoded from the QCmdTyp[1:0] variable.

From the Reconnected state, the state machine transitions to one of four states depending on the command type. If it was a Queued DMA Read command, then the state machine transitions to state AwaitDataFIS_DI. If it was a Queued DMA Write command, then the state machine transitions to state AwaitActivateFIS_DI. If it was a Queued Packet command that uses DMA for the data transfer, then the state machine transitions to state AwaitDMA_Pckt. If it was a Queued Packet command that uses PIO for the data transfer, then the state machine transitions to state AwaitSetupFIS_Pckt.

From there, the Command Tracker expects the same flow for these queued commands as it does for their non-queued counter-parts. The only difference is that anytime the Command Tracker has detected that the device has sent status to the host using a D2H Register FIS, instead of forwarding the FIS to the host, it has to transition to state ModifyD2H_RegFIS, where it has to check if the device is making another Reconnection Request for another queued command that it may be ready to complete next.

Removal of Outstanding Requests from the OR Table

The Command Tracker removes an entry from the OR_Table when it detects the completion of a queued command that was reconnected some time after a bus release was performed. Queued commands that have entries in the OR_Table but were not bus released by the device do not have to be removed. These entries may be written over with the command information for the next incoming queued commands.

When the Command Tracker detects the completion of a queued command, it transitions to state AwaitHostSYNC and waits until it detects a SYNC primitive from the host-side interface of the dual port adapter. If SYNC is detected and the Reconnected flag is set, then the state machine transitions to state DequeueCmd. In this state, the Tag from the recently completed command, DoneTag[4:0], is written to the tail (FP_Tail) of the Free Pointers Queue, and then FP_Tail is incremented by one. This effectively frees up a new available slot in the OR_Table.

The state machine also clears the Reconnected flag in state DequeueCmd, asserts the Rearb signal to the arbitration block, and then transitions back to state LinkIdle. When the Command Tracker is back in the LinkIdle state, it checks for another command from one of the hosts to track or for a Bus Reconnection request to track, or for a posted Non-Queued command that was waiting for the OR_Table to be empty.

Exemplary Storage System

The present invention may be implemented in a storage device for use in a storage network. The storage device may be a storage disk array for use in an enterprise storage system (i.e., a SAN), or a storage server useful for network attached storage (i.e., NAS) comprising one or more storage cells, wherein each storage cell may comprise a pool of storage devices. Each storage cell may comprise redundant storage controllers coupled to the disk group. The storage controllers may be coupled to the storage devices using a suitable high-speed data connection, or through a network such as a FC fabric or the like. The storage controllers may be communicatively coupled through a point-to-point connection such as, for example, a PCI bus or a SCSI bus.

Figure 9:
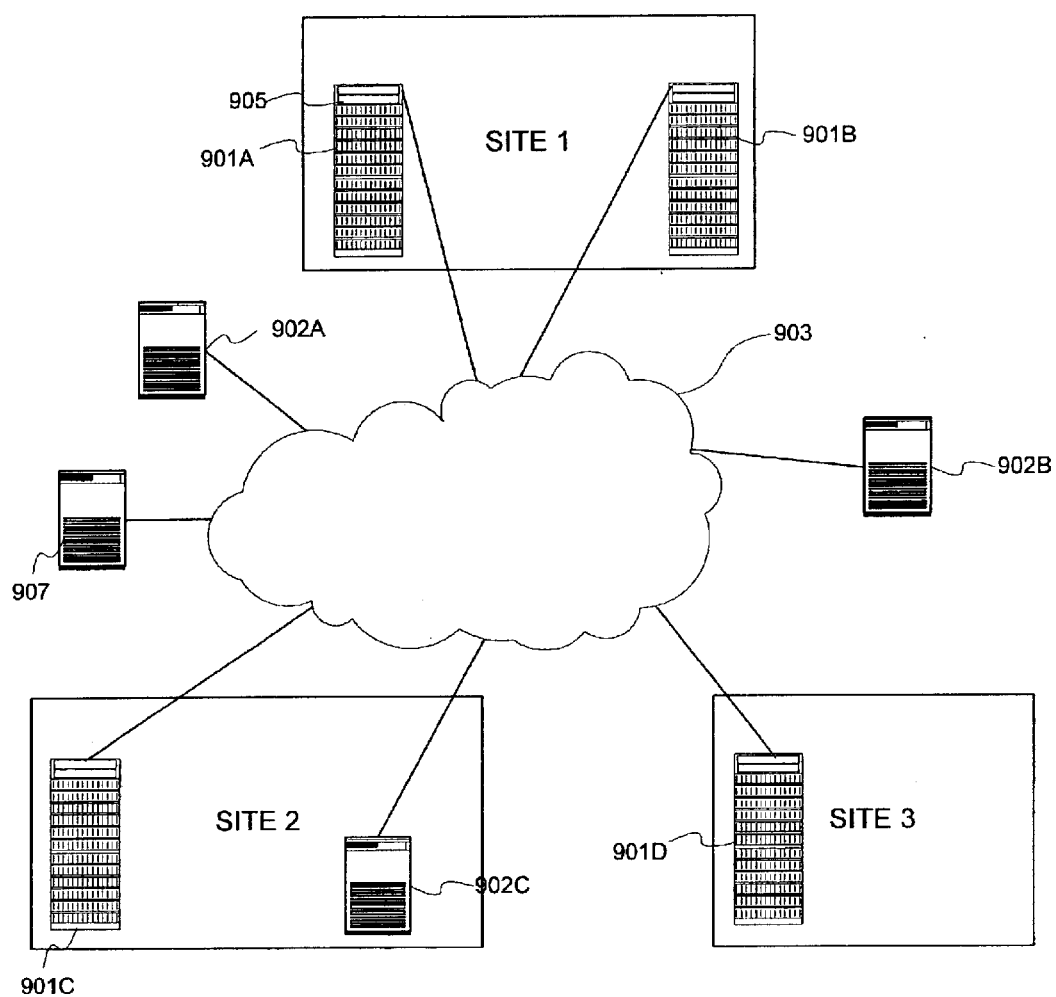
FIG. 9 is a schematic depiction of storage systems in which an adapter in accordance with the present invention may be implemented.

FIG. 9 is a schematic depiction of a multi-site storage area network (SAN) in which the present invention may be implemented. The exemplary storage area network includes three separate sites (Site 1, Site 2 and Site 3). It will be understood, however, that any number of sites may be provided to meet the needs of a particular application. The various sites may be physically proximate, or separated by an arbitrary physical or topological separation. Physical distance refers to a physical separation such as between buildings, cities, or other geographical regions. Topological separation refers to separation between two network nodes with respect to the communication network that may or may not correspond to physical distance. Topological separation between two nodes typically increases as more devices such as switches, routers, and network connections are added between the two nodes, and may be considered to be greater for nodes coupled by slower communication links. A particular implementation may well limit the number of possible sites, and may well limit the maximum or minimum physical or topological separation of sites. Each site includes one or more storage cells 901, such as cells 901A, 901B, 901C and 901D. Any number of storage cells 901 may be included in any site, although the number implemented in any particular application may be constrained to meet the needs of that application.

The storage implemented at various sites may be accessed by host computer 902, such as host computers 902A, 902B and 902C. Host computers are generally machines that consume or require data storage. Typical host computers 902 demand large quantities of storage such as mainframes, web servers, transaction processors, and the like. However, a host computer 902 may comprise a computer of any processing capacity that requires or benefits from network storage either to reduce cost of the host 902, implement more storage capacity than practical in a host 902, share data amongst multiple hosts 902, or the like. A host computer 902 may be connected to the storage cells 901 via a connection to network 903 such as illustrated by host computers 902A and 902B. In many cases, one or more host computers 902 will be located at a site.

Storage cells 901 and hosts 902 have a communication connection with data communication network 903. Storage cells 901 implement a quantity of data storage capacity that is accessible through storage controllers 905 that implement one or more connections to network 901. Storage cells 901 typically implement hundreds of gigabytes to terabytes of physical storage capacity. Preferably, controllers 905 virtualize the physical storage capacity such that it is configurable into logical units (LUNs) of storage capacity. The LUNs implement an arbitrary quantity of logical address block storage. Each LUN may implement a specified level of data protection, such as RAID 0-5 data protection. Hosts 902 access physical storage capacity by addressing read and write operations to specified LUNs, and can be otherwise unaware of the physical storage architecture or data protection strategy for a particular LUN that is being accessed. Storage controllers 905 manage the tasks of allocating physical storage capacity to specified LUNs, monitoring and maintaining integrity of the LUNs, moving data between physical storage devices, and other functions that maintain integrity and availability of the data stored therein.

Network 903 may operate pursuant to any of a variety of communication protocols, and/or may comprise a plurality of interconnected networks. In particular examples, network 903 may comprise at least two independent fibre channel fabrics to provide redundancy. These fibre channel fabrics may incorporate long-distance connection protocols such as asynchronous transfer mode (ATM) and Internet protocol (IP) connections that enable sites to be separated by significant distances.

A SAN management appliance (SMA) 907 may be connected to network 903 to enable connections to storage cells 901. In practice, a number of SMAs 907 are provided, and typically an SMA 907 is located at each site to provide management operation for the storage cells 901 at that site. However, because each SMA 907 communicates through network 903, the physical and topological location of SMAs 907 is very flexible. SMAs 907 are preferably implemented at topological locations that provide redundant connections to the storage cells 901.

Network 903 may be accessible to all components at Site 1, Site 2, and Site 3 including hosts 902 and controllers 905. In preferred implementations, each component has redundant links to network 903, and network 903 includes redundant sub-networks 2. Redundancy provides connectivity in event of failure or degradation of some portions of network 903. Redundancy also enables connectivity in event of failure or degradation of controllers 905 and/or interface components of hosts 902.

Although the preceding description refers to specific embodiments of the invention, the invention is not necessarily limited to the particular embodiments described herein. It is to be understood that various other adaptations and modifications may be made within the spirit and scope of the invention as set forth in the appended claims.

Exemplary Link Layer Logic Flow

Figure 10:
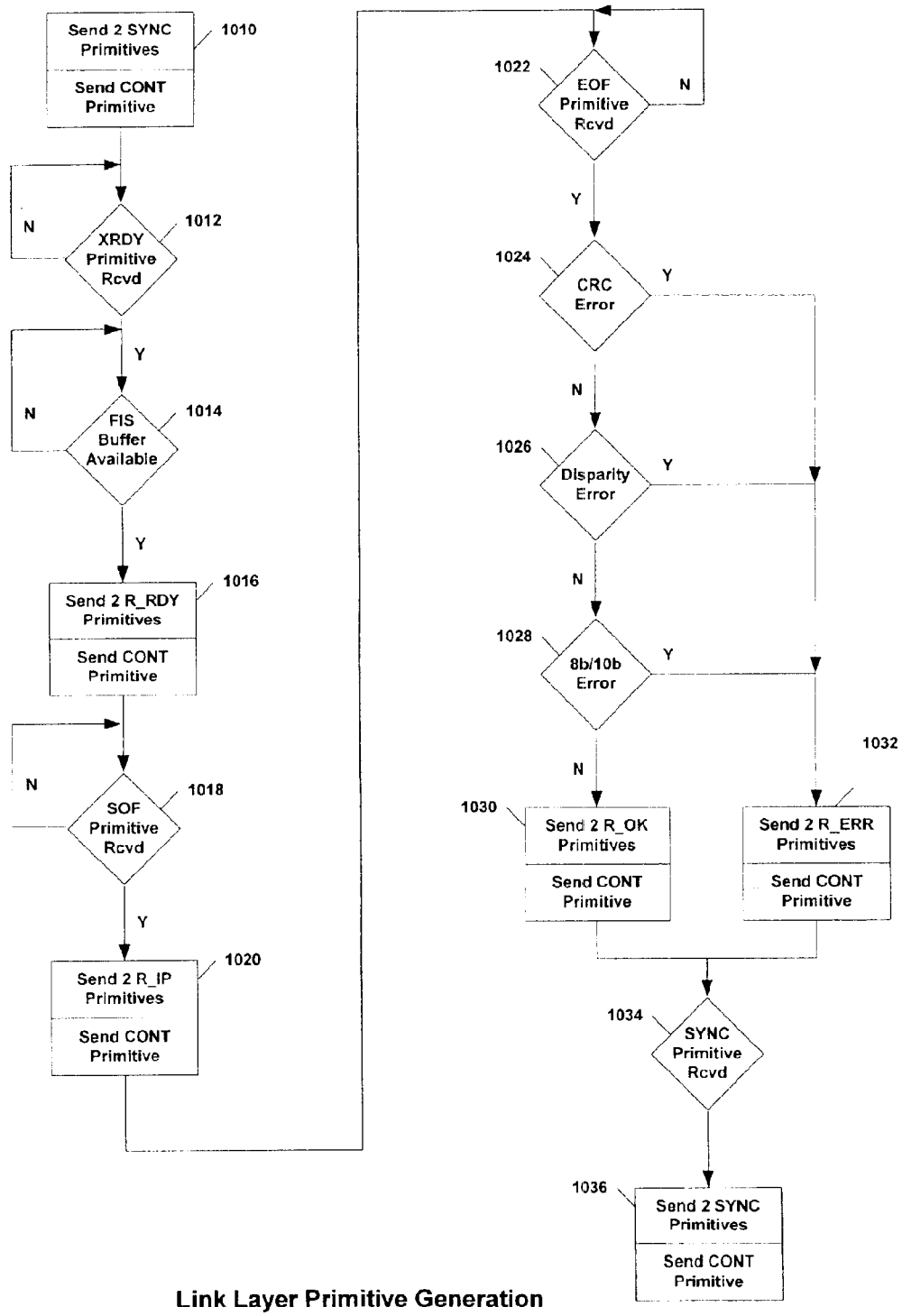
FIG. 10 is a flowchart illustrating logic instructions implemented by the link layer for decoding and generating serial ATA primitives.

FIG. 10 is a flowchart illustrating logic instructions implemented by the link layer for decoding and generating serial ATA primitives in accordance with an exemplary embodiment of the invention. Referring to FIG. 10, at step 1010 the link layer send two SYNC primitives and a CONT primitive. At step 1012, the link layer enters a loop that waits to receive an XRDY primitive. At step 1014, the link layer enters a loop that wait for a FIS buffer to become available.

At step 1016 (after the FIS buffer is available) the link layer sends two R_RDY primitives and a CONT primitive. The link layer then enters a loop that waits to receive a SOF primitive.

At step 1020 the link layer sends two R_IP primitives and a CONT primitive. At step 1022 the link layer waits to receive and EOF primitive. At step 1024 the link layer determines whether there is a Cyclic Redundancy Check (CRC) error. If not, then a step 1026 the link layer determines whether there was a disparity error. If not, then at step 1028 the link layer determines whether there was an 8b/10b error.

If none of these errors occurred, then at step 1030 the link layer sends two R_OK primitives and a CONT primitive. By contrast, if any of these errors occurred, then at step 1032 the link layer sends two R_ERR primitives and a CONT primitive.

At step 1034 the link layer enters a loop that waits for a SYNC primitive to be received. After the SYNC primitive is received, the link layer sends two SYNC primitives and a CONT primitive.

Figure 11:
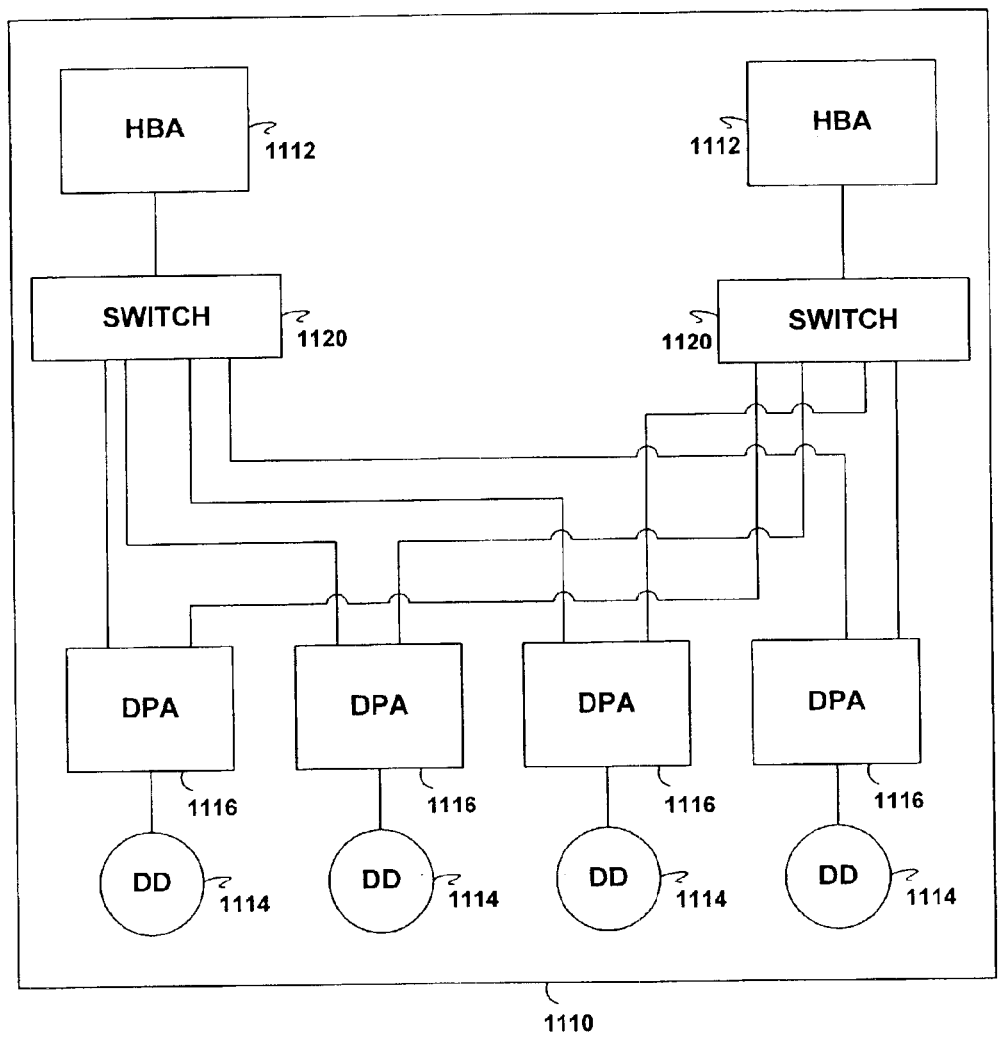
FIG. 11 is a schematic depiction of a storage module incorporating a dual port adapter.

FIG. 11 is a schematic depiction of an exemplary storage module 1110 in which an adapter as described herein may be implemented. One of skill in the art will appreciate that storage module 1110 has been greatly simplified for purposes of clarity. Referring to FIG. 11, storage module 1110 may include redundant host bus adapters (HBAs) 1112 and a plurality of storage devices 1114 connected to the NSCs by suitable communication links. In an exemplary embodiment, a switch 1120 routes communications between HBAs 1112 and storage devices 1114. It will be appreciated that the particular communication protocol governing the communication between the storage devices 1114 and HBAs 1112 is not critical to the present invention. The communication link may be a simple communication link, a bus, or may be implemented by a switched fabric.

The HBAs receive requests for information from host computers, process the requests, and retrieve the information from the storage devices 1114. The storage devices may be ATA disk drives. HBAs 1112 may be embodied as a printed circuit board including one or more microprocessors and associated memory. The processor executes logic, including firmware stored in ROM, for managing communication with storage devices 1114.

A dual port adapter 1116 is disposed in the communication path between at least one, and preferably each, storage device 1114 and an HBA 1112. As described above, the dual port adapter 1116 permits the storage device 1114 to which it is connected to maintain a communication link with two host bus adapters 1112, thereby permitting ATA drives to be used in a system with redundant HBAs.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

What is claimed is:

1. An adapter for enabling multiple hosts to share access to a single parallel ATA device, comprising:
   a switch for receiving commands from multiple hosts;
   a memory module for storing identifying information associated with a received command;
   an arbitration logic module operatively connected to the switch for assigning a priority scheme to received commands; and
   a state machine that determines when a received command has been completed by the parallel ATA device and updates the memory module to indicate that the commend has been completed.

2. An adapter according to claim 1, wherein the switch includes an input for receiving commands from two hosts.

3. An adapter according to claim 1, wherein the memory module stores the original Tag associated with each outstanding command.

4. An adapter according to claim 3, wherein the memory module further stores information identifying the host that originated the command.

5. An adapter according to claim 4, wherein the memory module further stores information identifying the type of queued command.

6. An adapter according to claim 1, further comprising a pointer queue for indicating available spaces in the memory module.

7. An adapter according to claim 1, wherein the arbitration logic module implements a round-robin priority scheme.

8. An adapter according to claim 1, further comprising a first buffer for storing and decoding information received from a host.

9. An adapter according to claim 1, further comprising a second buffer for storing and decoding information received from the parallel ATA device.

10. An adapter according to claim 1, further comprising a third buffer for storing non-queued commands received from a host.

11. A method for enabling multiple hosts to share access to a single parallel ATA device, comprising:
    receiving commands from a plurality of hosts;
    storing identifying information associated with received commands in a memory module;
    executing an arbitration scheme to assign a priority to received commands;
    forwarding the received command having the highest priority to the parallel ATA device;
    monitoring execution of the commands by the parallel ATA device; and
    updating the memory module to reflect completion of a command.

12. A method according to claim 11, wherein storing identifying information includes storing the original Tag associated with each outstanding command.

13. A method according to claim 12, wherein storing identifying information includes storing information identifying the host that originated the command.

14. A method according to claim 12, wherein storing identifying information includes storing information identifying the type of queued command.

15. A method according to claim 11, wherein monitoring execution of the commands by the parallel ATA device includes decoding incoming ATA FIS's passed up from a Link Layer state machines associated with each port.

16. A method according to claim 15, wherein monitoring execution of the commands by the parallel ATA device further includes detecting parallel ATA primitives that indicate the completion of FIS transmissions and receptions.

17. A storage module adaptable for use in a storage area network, comprising:
    a plurality of host bus adapters that receive communication requests from one or more host computers;
    a plurality of storage devices communicatively connected with the host bus adapters, wherein the plurality of storage devices includes an ATA disk drive; and
    a dual port adapter connected to at least one ATA disk drive, such that the ATA disk drive can maintain communications with at least two host bus adapters.

18. The storage module of claim 17, further comprising a switch communicatively connected to the host bus adapters and the dual port adapters, wherein the switch routes communications from a host bus adapter to a dual port adapter.

19. The storage module of claim 18, further comprising a bus communicatively connected to the host bus adapter and the dual port adapters.

20. The storage module of claim 17, wherein the dual port adapter includes:
a switch for receiving commands from multiple hosts;
a memory module for storing identifying information associated with a received command;
an arbitration logic module operatively connected to the switch for assigning a priority scheme to received commands; and
a state machine that determines when a received command has been completed by the ATA disk drive and updates the memory module to indicate that the command has been completed.

21. The storage module of claim 17, wherein the ATA disk drive comprises a serial ATA disk drive or a parallel ATA disk drive.

22. A method for constructing a storage system, the method comprising:
communicatively connecting a first host bus adapter to a dual port adapter;
communicatively connecting a second host bus adapter to the dual port adapter; and
communicatively connecting at least one storage device to the dual port adapter, the at least one storage device comprising an ATA disk drive;
wherein the ATA disk drive is enabled to maintain communication with the first host bus adapter and the second host bus adapter via the dual port adapter.

23. The method of claim 22, further comprising:
communicatively connecting a switch between (i) the first host bus adapter and (ii) the dual port adapter and at least one other dual port adapter;
wherein the switch is capable of routing communications from the first host bus adapter to the dual port adapter and the at least one other dual port adapter.

24. The method of claim 23, further comprising:
communicatively connecting at least one other storage device to the at least one other dual port adapter.

25. The method of claim 22, wherein the three steps of communicatively connecting comprise at least one of:
connecting one or more communication links;
connecting one or more buses; or
connecting at least one switched fabric.

26. The method of claim 22, wherein:
communicatively connecting a first host bus adapter to a dual port adapter comprises coupling the first host bus adapter to an arbiter of the dual port adapter; and
communicatively connecting a second host bus adapter to the dual port adapter comprises coupling the second host bus adapter to the arbiter of the dual port adapter;
wherein the arbiter is adapted to implement a priority scheme for commands that are received from the first host bus adapter and the second host bus adapter.

27. The method of claim 22, wherein the ATA disk drive comprises a serial ATA disk drive or a parallel ATA disk drive.

28. A storage system comprising:
a plurality of host bus adapters that are capable of receiving communication requests from one or more host computers;
a plurality of storage devices communicatively connected with the plurality of host bus adapters, wherein the plurality of storage devices includes at least one ATA device;
a switch adapted to receive commands from the plurality of host bus adapters;
memory adapted to store identifying information associated with each received command; and
arbitration logic operatively connected to the switch and adapted to assign a priority scheme to received commands;
wherein the at least one ATA device is capable of receiving the commands from the plurality of host bus adapters via the switch.

29. The storage system of claim 28, wherein the storage system comprises at least one storage module that is adaptable for use in a storage area network (SAN).

30. The storage system of claim 28, wherein the at least one ATA device comprises at least one serial ATA device or at least one parallel ATA device.

31. The storage system of claim 28, further comprising:
a state machine that is adapted to determine when a received command has been completed by the at least one ATA device and to update the memory to indicate that the received command has been completed.

32. The storage system of claim 31, wherein the switch, the memory, the arbitration logic, and the state machine comprise a dual port adapter that is communicatively connected to the at least one ATA device such that the at least one ATA device is capable of maintaining communications with the plurality of host bus adapters.

33. The storage system of claim 32, wherein the dual port adapter is adapted to assign a new tag for each command received from the plurality of host bus adapters and to use the newly-assigned tag in communications with the at least one ATA device.

34. The storage system of claim 32, wherein the dual port adapter is adapted to decode incoming ATA Frame information Structures (FISs) and to detect at least two serial ATA primitives comprising "R_OK" and "R_ERR".

35. The storage system of claim 28, wherein the identifying information associated with each received command comprises information that identifies which host bus adapter of the plurality of host bus adapters originated the received command.

36. The storage system of claim 28, wherein the identifying information associated with each received command comprises information that identifies a type of queued command for each received command comprising a queued command.

37. The storage system of claim 28, wherein the identifying information associated with each received command comprises an original tag as sent by a host bus adapter of the plurality of host bus adapters that sent each received command.

38. The storage system of claim 28, further comprising:
a free pointers queue that is adapted to indicate one or more available spaces in the memory.

39. The storage system of claim 28, further comprising:
a first buffer that is capable of storing and decoding information received from at least one host bus adapter of the plurality of host bus adapters;
a second buffer that is capable of storing and decoding information received from the at least one ATA device; and
a third buffer that is capable of storing non-queued commands received from the at least one host bus adapter of the plurality of host bus adapters.

* * * * *